United States Patent
Ikushima et al.

(10) Patent No.: US 6,775,483 B1
(45) Date of Patent: Aug. 10, 2004

(54) SYSTEM, DEVICE, AND METHOD FOR WAVELENGTH-DIVISION MULTIPLEX OPTICAL TRANSMISSION

(75) Inventors: Tsuyoshi Ikushima, Moriguchi (JP); Hiroyuki Sasai, Katano (JP); Masaru Fuse, Toyonaka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 584 days.

(21) Appl. No.: 09/659,758

(22) Filed: Sep. 11, 2000

(30) Foreign Application Priority Data

Oct. 21, 1999 (JP) .......................................... 11-300128

(51) Int. Cl.[7] .............................................. H04B 10/04
(52) U.S. Cl. ...................... 398/186; 398/183; 398/190; 398/198; 398/200
(58) Field of Search ................................ 398/183, 186, 398/189, 79, 190, 198, 200

(56) References Cited

U.S. PATENT DOCUMENTS

| 5,615,035 A | | 3/1997 | Koai .......................... 359/119 |
| 5,691,832 A | * | 11/1997 | Liedenbaum et al. ......... 398/43 |
| 5,768,449 A | * | 6/1998 | Fuse et al. ..................... 385/1 |
| 6,606,178 B1 | * | 8/2003 | Rhee et al. .................. 398/185 |

OTHER PUBLICATIONS

Catv, 1.55, "OPTCOM", No. 115, Jun. 1999, pp. 46–50.

* cited by examiner

Primary Examiner—M. R. Sedighian
(74) Attorney, Agent, or Firm—Wenderoth, Lind & Ponack, L.L.P.

(57) ABSTRACT

A wavelength-division multiplex optical transmission system is provided with: preliminary optical modulators 111 to 11n for outputting optical signals having different wavelengths from each other after being modulated by communications signals 11 to 1n that are signals to be supplied to specific optical receiving parts; an optical fiber 510 for transmitting the multiplexed optical signal; a subsequent optical modulator 210 for collectively modulating the transmitted optical signal so as to collectively modulate the optical signals being multiplexed by a broadcast signal 20 that is to be supplied equally to all optical receiving parts; and an optical fiber 520 for transmitting the modulated optical signal. A frequency band for the broadcast signal 20 is set not to overlap with any of those of the communications signals 11 to 1n. Accordingly, in each of optical receiving parts 411 to 41n, an electrical signal in which the communication signal 11 to 1n and the broadcast signal 20 are frequency-multiplexed can be obtained.

19 Claims, 7 Drawing Sheets

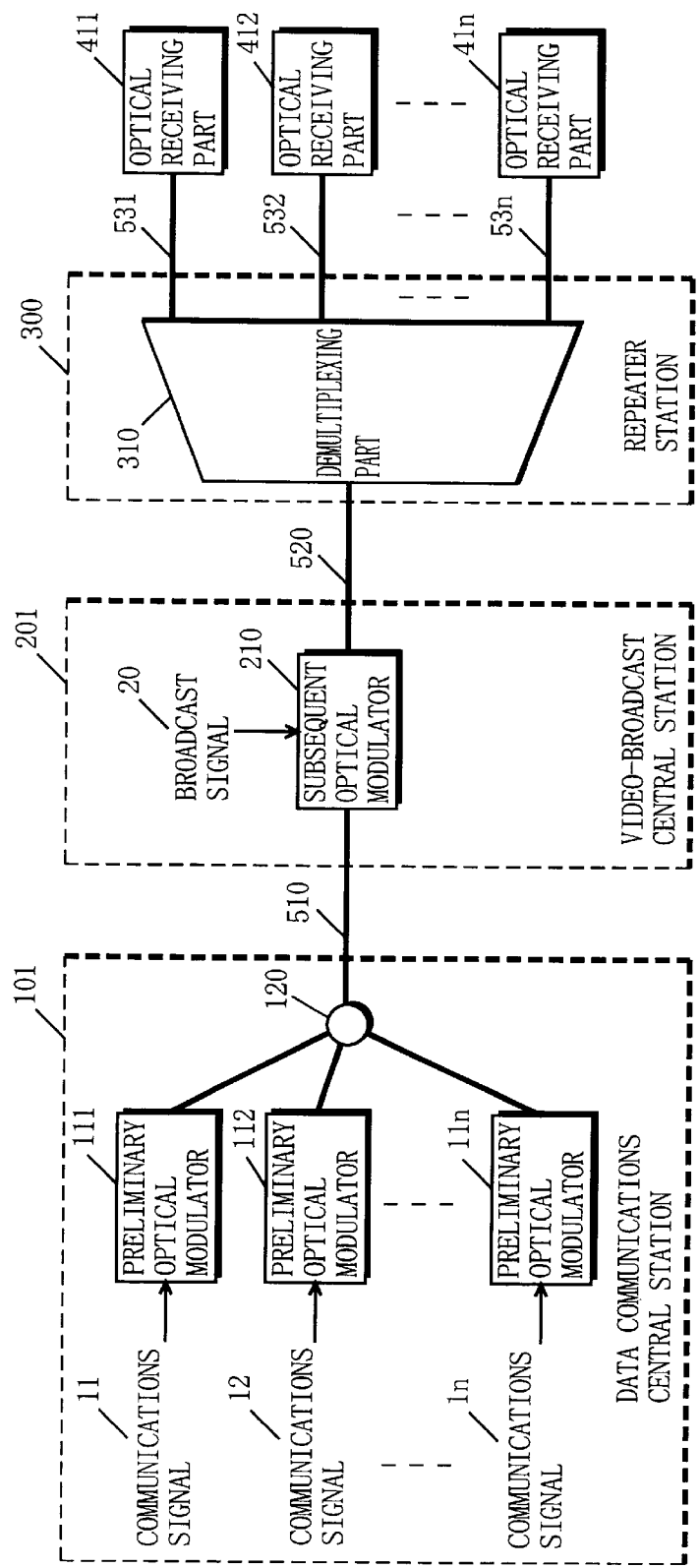

ELECTRICAL SIGNAL OBTAINED BY OPTICAL RECEIVING PART

COMMUNICATIONS SIGNAL

BROADCAST SIGNAL

COMMUNICATIONS SIGNAL

SPREAD-SPECTRUM-MODULATED COMMUNICATIONS SIGNAL

ELECTRICAL SIGNAL OBTAINED BY OPTICAL RECEIVING PART

BROADCAST SIGNAL

SPREAD-SPECTRUM-MODULATED BROADCAST SIGNAL

DESPREADED ELECTRICAL SIGNAL

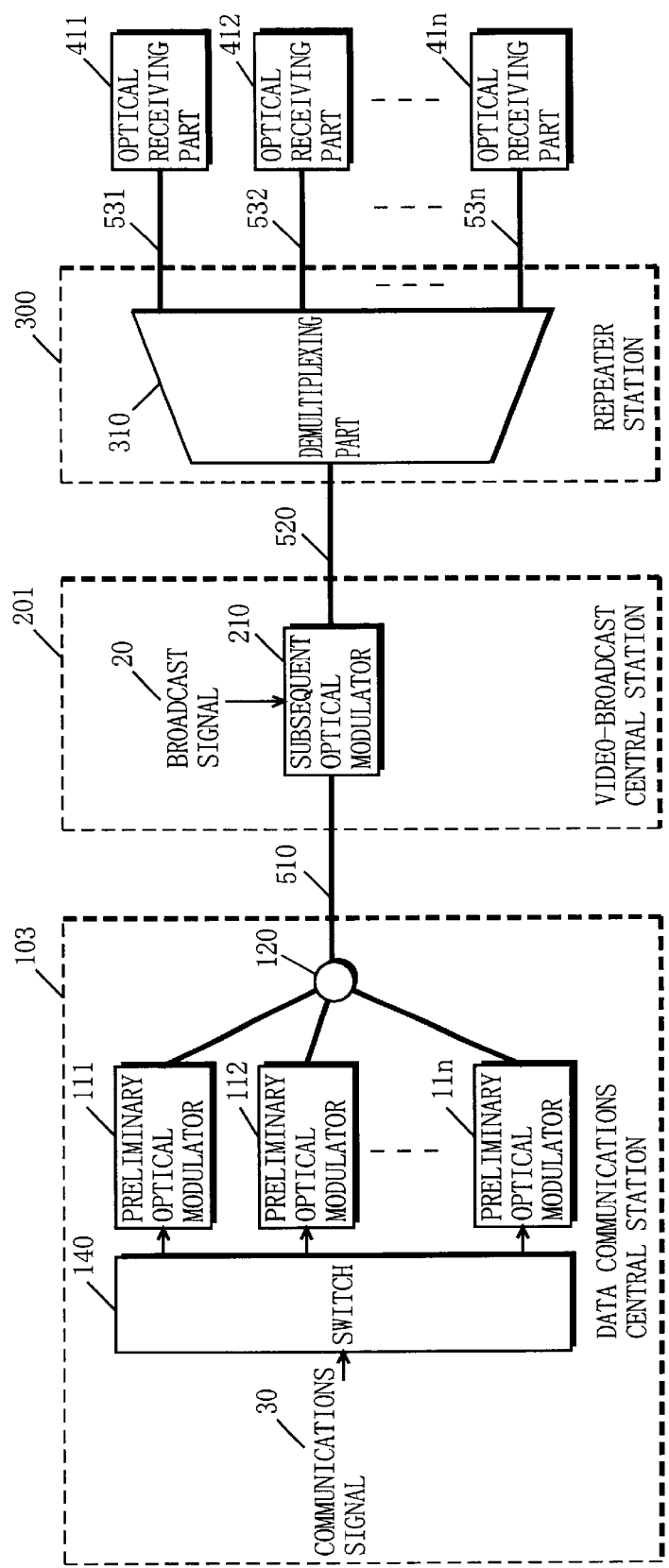
F I G. 5

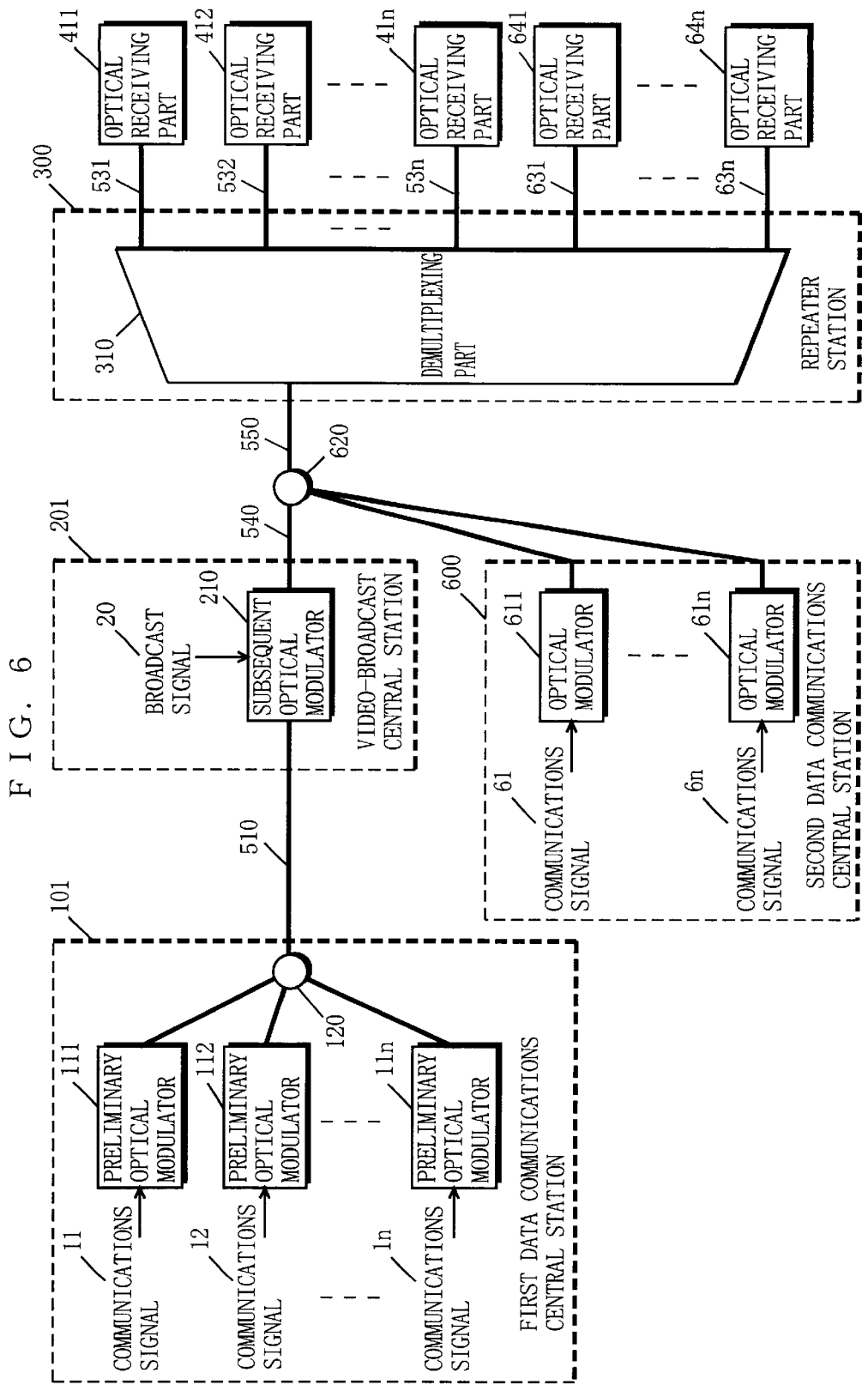
F I G. 6

SYSTEM, DEVICE, AND METHOD FOR WAVELENGTH-DIVISION MULTIPLEX OPTICAL TRANSMISSION

BACKGROUND OF THE INVENTION

1. Field of the Invention

The invention relates to wavelength-division multiplex optical transmission systems, and more particularly to a wavelength-division multiplex optical transmission system for transmitting signals to be supplied individually to a plurality of optical receiving parts and signals to be supplied equally thereto on a wavelength-division-multiplexed optical signal.

2. Description of the Background Art

Recently, in fields such as optical CATV systems, data communications services providing digital signals for data communications are offered together with conventional video-broadcast services. In such services, it is specifically required to offer a specific data communications service to each of a plurality of optical receiving parts while offering the same video-broadcast services equally to all optical receiving parts. Further, due to increasing data amount in data communications, a system for supplying large communications data individually to each optical receiving part at the same time of offering the conventional video-broadcast service is required and is under study.

A wavelength-division multiplex transmission technique is appropriate for simultaneously supplying large communications data to each of the optical receiving parts. With the technique, a plurality of signals are each superimposed on optical signals having different wavelengths from each other and multiplexed to become a single optical signal. After being transmitted through an optical transmission path such as an optical fiber, the multiplexed optical signal is separated for each wavelength, and thereby the optical signals before multiplexing are obtained.

Conventionally, a wavelength-division multiplex optical transmission system using the above technique is disclosed in "OPTCOM", No. 115, June 1999 issue, pp. 46 to 50. FIG. 7 is a block diagram showing the structure of the conventional wavelength-division multiplex optical transmission system. The system is described next below.

In FIG. 7, the conventional wavelength-division multiplex optical transmission system includes: a data communications central station 109; a video-broadcast central station 209; a repeater station 309; a plurality of optical receiving parts 411 to 41n; and a plurality of optical fibers 570, 580, and 591 to 59n. The data communications central station 109 is provided with a plurality of optical modulators 111 to 11n and a wavelength-division-multiplexing part 120. The video-broadcast central station 209 is provided with an optical modulator 290, and the repeater station 309 is provided with a demultiplexing part 310, a branching part 380, and a plurality of multiplexing parts 391 to 39n. The operation of the system is described next below.

In the data communications central station 109, a plurality of communications signals 11 to 1n, which are to be supplied individually to each of the plurality of optical receiving parts 411 to 41n as the data communications services, are inputted to the plurality of optical modulators 111 to 11n, respectively. The plurality of optical modulators 111 to 11n each output optical signals modulated by the incoming communications signals 11 to 1n and each having different wavelengths $\lambda 1, \lambda 2, \ldots, \lambda n$. The output optical signals are multiplexed in the wavelength-division-multiplexing part 120 and transmitted to the repeater station 309 through the optical fiber 570. In the video-broadcast central station 209, a broadcast signal 20, which is to be supplied equally to the plurality of optical receiving parts 411 to 41n as the video-broadcast service, is inputted to the optical modulator 290. The optical modulator 290 outputs an optical signal modulated by the incoming broadcast signal 20 and having a wavelength $\lambda b$ that is different from any of the wavelengths of the optical signals outputted from the optical modulators 111 to 11n. The output optical signal is transmitted to the repeater station 309 through the optical fiber 580. In the repeater station 309, the optical signal transmitted through the optical fiber 570 from the data communications central station 109 is separated, based on the wavelengths, in the demultiplexing part 310 into the optical signals having the wavelengths $\lambda 1, \lambda 2, \ldots, \lambda n$. Also, the optical signal transmitted through the optical fiber 580 from the video-broadcast central station 209 is branched in the branching part 380 to a plurality of optical signals all having the wavelength $\lambda b$. Each of the separated optical signals separated in the demultiplexing part 310 is supplied to the respective multiplexing parts 391 to 39n, and therein, multiplexed with each of the branched optical signals also supplied thereto. The multiplexed optical signals are each transmitted through the optical fibers 591 to 59n to the optical receiving part 411 to 41n. That is to say, the optical signal obtained by multiplexing the optical signal having the $\lambda 1$ wavelength and the optical signal having the $\lambda b$ wavelength is supplied to the optical receiving part 411, and the optical signal obtained by multiplexing the optical signal having the $\lambda 2$ wavelength and the optical signal having the $\lambda b$ wavelength is supplied to the optical receiving part 412. Other optical receiving parts 413 to 41n are similarly supplied with the multiplexed optical signals. Each of the optical receiving parts 411 to 41n separates, by using a wave separator not shown in the drawing, the optical signal supplied thereto into the optical signal having any one of the wavelengths $\lambda 1, \lambda 2, \ldots, \lambda n$ that carries the corresponding communications signal 11 to 1n, and the optical signal having the $\lambda b$ wavelength that carries the broadcast signal 20. Thereafter, each of the optical receiving parts 411 to 41n converts, by using two optical receivers not shown in the drawing, each of the separated optical signals into electrical signals. Note, although omitted in the drawing, optical amplification is carried out in each part of the system, as required, to compensate for the transmission loss and the splitting loss.

As described, according to the conventional wavelength-division multiplex optical transmission system, path selection is made based on the wavelength, thereby enabling simultaneous transmission of the communications signals individually supplied to each of the optical receiving parts and the broadcast signal equally supplied to the optical receiving parts. In other words, with such system, the video-broadcast service offered to all optical receiving parts and the data communications service offered to a specific optical receiving part can be combined.

In the system shown in FIG. 7, however, to combine the video-broadcast service offered to all optical receiving parts and the data communications service offered to a specific optical receiving part, the repeater station 309 is required to first separate, for each wavelength, the received optical signal obtained by wavelength-division-multiplexing the optical signals carrying the communications signals, and then again multiplexing each separated signal with the optical signal carrying the broadcast signal 20. Accordingly, the problem comes up that the structure of the repeater station 309 becomes complex. Moreover, each of the optical receiving parts 411 to 41n is required to be provided with the wave separator and two optical receivers in order to receive the optical signal obtained by multiplexing two types of optical signal, i.e., the optical signal for carrying the respective communications signals 11 to 1n; and the optical signal for carrying the broadcast signal 20. As a result, another problem comes up that the cost of the optical receiving parts 411 to 41n increases.

To solve the problems above, considered is a method that each of the communications signals 11 to 1n is previously frequency-division-multiplexed with the broadcast signal 20 to become an electrical signal, and the frequency-division-multiplexed electrical signals are each superimposed on optical signals having predetermined wavelengths for wavelength-division multiplex optical transmission. According to the method, an optical signal of a different wavelength for transmitting the broadcast signal 20 is not required. Indeed, the broadcast signals 20 are transmitted on the optical signals each carrying the communications signals 11 to 1n. Accordingly, an optical transmission path to the repeater station can be implemented by a single optical fiber, and the repeater station by only the branching part 310. Further, each of the optical receiving parts 411 to 41n can reproduce, only by converting the received optical signal into an electrical signal, the electrical signal in which one of the communication signals 11 to 1n and the broadcast signal 20 are frequency-division-multiplexed. Therefore, each of the optical receiving parts 411 to 41n does not require a costly wave separator but requires only one optical receiver. In such manner, the total structure of the system can be simplified and the cost of the optical receiving parts 411 to 41n can be reduced.

With the above described system, however, each of the communication signals 11 to 1n and the broadcast signal 20 are required to be frequency-division-multiplexed in advance. Generally, there are many cases that the data communications service and the video-broadcast service are offered by different providers (or broadcast media). That is to say, there are many cases that the sources of the communications signals 11 to 1n and the broadcast signal 20 are far in distance each other. In such cases, the communications signals 11 to 1n or the broadcast signal 20 is required to be transmitted from its source as an electrical signal to a predetermined frequency-division-multiplexing part located apart from the source. Since a transmission attenuation of the electrical signal is larger than that of the optical signal, the sources of the communications signals 11 to 1n and the broadcast signal 20 should be kept not so far apart, disadvantageously resulting in restrictions, in distance, on placement of the sources.

SUMMARY OF THE INVENTION

Therefore, an object of the present invention is to provide a wavelength-division multiplex optical transmission system with simple structure and low cost, capable of simultaneously offering a broadcast service to all optical receiving parts and a communications service to a specific optical receiving part, and having flexibility in placement of each signal source of communications signal and broadcast signal.

The present invention has the following features to achieve the object above.

A first aspect of the present invention is directed to a wavelength-division multiplex optical transmission system for simultaneously transmitting first signals to be supplied individually to a plurality of optical receiving parts and a second signal to be supplied equally thereto on a wavelength-division-multiplexed optical signal. A system in accordance with the first aspect of the present invention comprises: a plurality of preliminary optical modulators, to which the plurality of first signals are each inputted, each outputting optical signals having different wavelengths from each other and being modulated by the plurality of first signals; a wavelength-division-multiplexing part multiplexing the optical signals outputted by the plurality of preliminary optical modulators; a subsequent optical modulator, to which the second signal is inputted, modulating the optical signal received from the wavelength-division-multiplexing part by the second signal so as to collectively modulate the optical signals being multiplexed; a demultiplexing part separating the optical signal modulated by the subsequent optical modulator for each wavelength; and the plurality of optical receiving parts each provided for receiving each of the optical signals separated and outputted by the demultiplexing part, and converting the received optical signal into an electrical signal.

As described above, in the first aspect, the second signal can be transmitted on the same optical signal that transmits the first signals without using the optical signal having a wavelength unique thereto. Further, as the second signal and the first signals are each inputted to the different modulators, the electrical signals can be each inputted to the modulators without attenuation even if the signal sources of the electrical signals are located away from each other. As a result, the total system structure can be simplified, the costs can be reduced, and further the flexible placement of the signal sources can be achieved. Note that the first signals are signals each individually supplied to the plurality of optical receiving parts such as communications signals and the second signal is the signal equally supplied to the plurality of optical receiving parts such as a broadcast signal.

According to a second aspect, in the first aspect, a frequency band for the second signal does not overlap with any of frequency bands for the plurality of first signals.

As described above, in the second aspect, the electrical signals obtained in the plurality of optical receiving parts each include the first signal and the second signal in different frequency bands. Accordingly the first signal and the second signal can be separated each other and extracted by using a band-pass filter.

According to a third aspect, in the first aspect, the wavelength-division-multiplexing part and the demultiplexing part are connected to each other through an optical transmission path, and the subsequent optical modulator is provided at an arbitrary place on the optical transmission path.

As described above, in the third aspect, the subsequent optical modulator to which the second signal is inputted can be provided at an arbitrary place regardless of the distance between the plurality of preliminary optical modulators to which the first signals are each inputted. Accordingly, the signal sources of the first signals and the second signal can be placed at arbitrary places regardless of each other's distance.

According to a fourth aspect, in the first aspect, the system further comprises: a plurality of first spread spectrum modulators each spread-spectrum-modulating each of the plurality of first signals with spreading codes for output to the plurality of preliminary optical modulators; a second spread spectrum modulator spread-spectrum-modulating the second signal with a spreading code for output to the subsequent optical modulator; and a plurality of despreading parts each despreading each of the electrical signals converted in the plurality of optical receiving parts, wherein the spreading code used by the second spread spectrum modulator is different from any of the spreading codes used by the first spread spectrum modulators.

As described above, in the fourth aspect, the first signals and the second signal are each spread-spectrum-modulated by different spreading codes for transmission. It is thus possible to separately extract the first signal and the second signal by despreading each of the signals being carried on the optical signal by using respective spreading codes. Accordingly, the frequency bands for the first signals and the second signal can be set at will without restrictions, thereby enabling efficient utilization of the frequency bands.

According to a fifth aspect, in the first aspect, the system further comprises: a subsequent wavelength-division-multiplexing part provided between the subsequent optical modulator and the demultiplexing part, and multiplexing the optical signal outputted by the subsequent optical modulator and other one or more optical signals, wherein wavelengths of the other one or more optical signals being multiplexed differ from any of the wavelengths of the optical signals outputted by the plurality of preliminary optical modulators, and differ from each other.

As described above, in the fifth aspect, optical signals to be supplied to the optical receiving parts which are in no need of the second signal can be transmitted together with the optical signal carrying the second signal by sharing a transmission path and a repeater station. Accordingly, the system is efficiently used, resulting in simplification of the system.

A sixth aspect of the present invention is directed to a wavelength-division multiplex optical transmission system for simultaneously transmitting a first signal to be supplied individually to any of a plurality of optical receiving parts and a second signal to be supplied equally thereto on a wavelength-division-multiplexed optical signal. A system in accordance with the sixth aspect of the present invention comprises: a switch, to which the first signal is inputted, selecting a destination of the first signal from among said plurality of optical receiving parts; a plurality of preliminary optical modulators each provided in correspondence with each of the optical receiving parts, each being supplied with said first signal from said switch based on the result of selection made thereby, and each outputting optical signals having different wavelengths from each other and being modulated by the first signal when being supplied therewith and without modulation when not being supplied therewith; a wavelength-division-multiplexing part multiplexing the optical signals outputted by the plurality of preliminary optical modulators; a subsequent optical modulator, to which the second signal is inputted, modulating the optical signal received from the wavelength-division-multiplexing part by the second signal so as to collectively modulate the optical signals being multiplexed; a demultiplexing part separating the optical signal modulated by the subsequent optical modulator for each wavelength; and the plurality of optical receiving parts each provided for receiving each of the optical signals separated and outputted by the demultiplexing part, and converting the received optical signal into an electrical signals, wherein a frequency band for the second signal does not overlap with a frequency band for the first signal.

As described above, in the sixth aspect, a path for the first signal is easily selected by the switch. Accordingly, the first signal can be selectively supplied only to a desired optical receiving part while equally supplying the second signal to all optical receiving parts.

According to a seventh aspect, in the sixth aspect, the wavelength-division-multiplexing part and the demultiplexing part are connected to each other through an optical transmission path, and the subsequent optical modulator is provided at an arbitrary place on the optical transmission path.

As described above, in the seventh aspect, the electrical signal obtained in the optical receiving part that is to be supplied with both of the first and second signals include the first and second signals in different frequency bands. Accordingly the first signal and the second signal can be separated each other and extracted by using a band-pass filter.

An eighth aspect of the present invention is directed to a wavelength-division multiplex optical transmission device for simultaneously transmitting first signals to be supplied individually to a plurality of optical receiving parts and a second signal to be supplied equally thereto on a wavelength-division-multiplexed optical signal. A device in accordance with the eighth aspect of the present invention comprises: a plurality of preliminary optical modulators, to which the plurality of first signals are each inputted, each outputting optical signals having different wavelengths from each other and being modulated by the plurality of first signals; a wavelength-division-multiplexing part multiplexing the optical signals outputted by the plurality of preliminary optical modulators; and a subsequent optical modulator, to which the second signal is inputted, modulating the optical signal received from the wavelength-division-multiplexing part by the second signal so as to collectively modulate the optical signals being multiplexed.

As described above, in the eighth aspect, the second signal can be transmitted on the same optical signal that transmits the first signals without using the optical signal having a wavelength unique thereto. Further, as the second signal and the first signals are each inputted to the different modulators, the electrical signals can be each inputted to the modulators without attenuation even if the signal sources of the electrical signals are located away from each other. As a result, the structure of the device can be simplified, the costs can be reduced, and further the flexible placement of the signal sources can be achieved.

According to a ninth aspect, in the eighth aspect, a frequency band for the second signal does not overlap with any of frequency bands for the plurality of first signals.

As described above, in the ninth aspect, the electrical signals obtained in the plurality of optical receiving parts each include the first signal and the second signal in different frequency bands. That is to say, the device can transmit the optical signal from which the first signal and the second signal can be separated each other and extracted by using a band-pass filter.

According to a tenth aspect, in the eighth aspect, the device further comprises: a plurality of first spread spectrum modulators each spread-spectrum-modulating each of the plurality of first signals with spreading codes for output to the plurality of preliminary optical modulators; and a second spread spectrum modulator spread-spectrum-modulating the second signal with a spreading code for output to the subsequent optical modulator, wherein the spreading code used by the second spread spectrum modulator is different from any of the spreading codes used by the first spread spectrum modulators.

As described above, in the tenth aspect, the first signals and the second signal are each spread-spectrum-modulated by different spreading codes for transmission. It is thus not required to set different frequency bands for both signals for transmission. Accordingly, the frequency bands for the first signals and the second signal can be set at will without restrictions, thereby enabling efficient utilization of the frequency bands.

An eleventh aspect of the present invention is directed to a wavelength-division multiplex optical transmission device for simultaneously transmitting a first signal to be supplied individually to any of a plurality of optical receiving parts and a second signal to be supplied equally thereto on a wavelength-division-multiplexed optical signal. A device in accordance with the eleventh aspect of the present invention comprises: a switch, to which the first signal is inputted, selecting a destination of the first signal from among the plurality of optical receiving parts; a plurality of preliminary optical modulators each provided in correspondence with each of the optical receiving parts, and each outputting optical signals having different wavelengths from each other and being modulated by the first signal when being supplied therewith and without modulation when not being supplied therewith; a wavelength-division-multiplexing part multiplexing the optical signals outputted by the plurality of preliminary optical modulators; and a subsequent optical modulator, to which the second signal is inputted, modulating the optical signal received from the wavelength-division-multiplexing part by the second signal so as to collectively modulate the optical signals being multiplexed, wherein a frequency band for the second signal does not overlap with a frequency band for the first signal.

As described above, in the eleventh aspect, a path for the first signal is easily selected by the switch. Accordingly, the first signal can be selectively supplied only to a desired optical receiving part while equally supplying the second signal to all optical receiving parts.

A twelfth aspect of the present invention is directed to a wavelength-division multiplex optical transmission method for simultaneously transmitting first signals to be supplied individually to a plurality of optical receiving parts and a second signal to be supplied equally thereto on a wavelength-division-multiplexed optical signal. A method according to the twelfth aspect of the present invention comprises; outputting optical signals having different wavelengths from each other and being modulated by the plurality of first signals; multiplexing the optical signals outputted in the outputting; and modulating the optical signal obtained in the multiplexing by the second signal so as to collectively modulate the optical signals being multiplexed.

As described above, in the twelfth aspect, the second signal can be transmitted on the same optical signal that transmits the first signals without using the optical signal having a wavelength unique thereto. Further, as the second signal and the first signals are each superimposed on the optical signals in the different steps, the electrical signals can be each superimposed on the optical signals without attenuation even if the signal sources of the electrical signals are located away from each other. As a result, the structure of the device can be simplified, the costs can be reduced, and further the flexible placement of the signal sources can be achieved.

According to a thirteenth aspect, in the twelfth aspect, a frequency band for the second signal does not overlap with any of frequency bands for the plurality of first signals.

As described above, in the thirteenth aspect, the electrical signals obtained in the plurality of optical receiving parts each include the first signal and the second signal in different frequency bands. That is to say, the device can transmit the optical signal from which the first signal and the second signal can be separated each other and extracted by using a band-pass filter.

According to a fourteenth aspect, in the twelfth aspect, the method further comprises; spread-spectrum-modulating each of the plurality of first signals with spreading codes before the outputting; and spread-spectrum-modulating the second signal with a spreading code before the modulating, wherein the spreading code used in the second signal spread spectrum modulating is different from any of the spreading codes used in the first signal spread spectrum modulating.

As described above, in the fourteenth aspect, the first signals and the second signal are each spread-spectrum-modulated by different spreading codes for transmission. It is thus not required to set different frequency bands for both signals for transmission. Accordingly, the frequency bands for the first signals and the second signal can be set at will without restrictions, thereby enabling efficient utilization of the frequency bands.

A fifteenth aspect of the present invention is directed to a wavelength-division multiplex optical transmission method for simultaneously transmitting a first signal to be supplied individually to any of a plurality of optical receiving parts and a second signal to be supplied equally thereto on a wavelength-division-multiplexed optical signal. A method according to the twelfth aspect of the present invention comprises: selecting a destination of the first signal from among the plurality of optical receiving parts: outputting optical signals having different wavelengths from each other and being modulated by the first signal for the optical receiving part selected as the destination and without modulation for other optical receiving parts; multiplexing the optical signals outputted in the outputting; and modulating the optical signal obtained in the multiplexing by the second signal so as to collectively modulate the optical signals being multiplexed, wherein a frequency band for the second signal does not overlap with a frequency band for the first signal.

As described above, in the fifteenth aspect, a path for the first signal is easily selected. Accordingly, the first signal can be selectively supplied only to a desired optical receiving part while equally supplying the second signal to all optical receiving parts.

A sixteenth aspect of the present invention is directed to a wavelength-division multiplex optical transmission device for simultaneously transmitting a plurality of first signals to be supplied individually to a plurality of optical receiving parts and a second signal to be supplied equally thereto on an optical signal. A device in accordance with the sixteenth aspect of the present invention comprises: input means for inputting an optical signal obtained by wavelength-division-multiplexing a plurality of optical signals having different wavelengths from each other and each being intensity-modulated by each of the plurality of first signals; input means for inputting the second signal; and intensity-modulating means for intensity-modulating the wavelength-division-multiplexed optical signal so as to collectively modulate the plurality of optical signals being multiplexed, by the second signal.

As described above, in the sixteenth aspect, the second signal can be transmitted on the same optical signal that transmits the first signals without using the optical signal having a wavelength unique thereto. Further, as the second signal and the first signals are each inputted to the different modulators, the electrical signals can be each inputted to the modulators without attenuation even if the signal sources of the electrical signals are located away from each other. As a result, the structure of the device can be simplified, the costs can be reduced, and further the flexible placement of the signal sources can be achieved.

According to a seventeenth aspect, in the sixteenth aspect, a frequency band for the second signal does not overlap with any of frequency bands for the plurality of first signals.

As described above, in the seventeenth aspect, the electrical signals obtained in the plurality of optical receiving parts each include the first signal and the second signal in different frequency bands. That is to say, the device can transmit the optical signal from which the first signal and the second signal can be separated each other and extracted by using a band-pass filter.

An eighteenth aspect of the present invention is directed to a wavelength-division multiplex optical transmission device for simultaneously transmitting a plurality of first signals to be supplied individually to a plurality of optical receiving parts and a second signal to be supplied equally thereto on an optical signal. A device in accordance with the eighteenth aspect of the present invention comprises: input means for inputting an optical signal obtained by wavelength-division-multiplexing a plurality of optical signals having different wavelengths from each other and each being intensity-modulated by each of the plurality of first signals which is spread-spectrum-modulated with spreading codes; spread spectrum modulating means for spread-spectrum-modulating the second signal with a spreading code; and intensity-modulating means for intensity-modulating the wavelength-division-multiplexed optical signal by the second signal so as to collectively modulate the plurality of optical signals being multiplexed, wherein the spreading code used for spread-spectrum-modulating the second signal is different from any of the spreading codes each used for spread-spectrum-modulating the plurality of first signals.

As described above, in the eighteenth aspect, the first signals and the second signal are each spread-spectrum-modulated by different spreading codes for transmission. It is thus not required to set different frequency bands for both signals for transmission. Accordingly, the frequency bands for the first signals and the second signal can be set at will without restrictions, thereby enabling efficient utilization of the frequency bands.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing the structure of a wavelength-division multiplex optical transmission system according to a first embodiment of the present invention;

FIG. 5 is a diagram showing the structure of a wavelength-division multiplex optical transmission system according to a third embodiment of the present invention;

FIG. 6 is a diagram showing the structure of a wavelength-division multiplex optical transmission system according to a fourth embodiment of the present invention.

DESCRIPTION OF THE PREFERRED EMBODIMENTS

First Embodiment

Figure 2C:
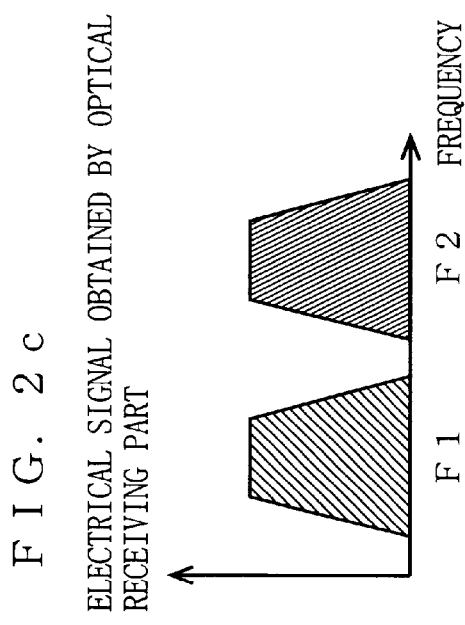
FIG. 2c is a diagram exemplarily showing a frequency spectrum of an electrical signal obtained in an optical receiving part in the first embodiment of the present invention.

FIG. 1 is a block diagram showing the structure of a wavelength-division multiplex optical transmission system according to a first embodiment of the present invention. In FIG. 1, the wavelength-division multiplex optical transmission system includes: a data communications central station 101; a video-broadcast central station 201; a repeater station 300; the plurality of optical receiving parts 411 to 41n; and a plurality of optical fibers 510, 520, and 531 to 53n. The data communications central station 101 is provided with a plurality of preliminary optical modulators 111 to 11n and a wavelength-division-multiplexing part 120, the video-broadcast central station 201 is provided with a subsequent optical modulator 210, and the repeater station 300 is provided with a demultiplexing part 310.

The operation of the wavelength-division multiplex optical transmission system of the first embodiment is described next below by referring to FIGS. 1, 2a, 2b, and 2c.

In the data communications central station 101, a plurality of communications signals 11 to 1n that are first signals, which are to be supplied individually to each of the optical receiving parts 411 to 41n as the data communications service, are inputted to the plurality of preliminary optical modulators 111 to 11n, respectively. The plurality of preliminary optical modulators 111 to 11n output optical signals modulated by corresponding incoming communications signals 11 to 1n and having different wavelengths λ1, λ2, ..., λn, respectively. The output optical signals are multiplexed in the wavelength-division-multiplexing part 120 and then transmitted to the video-broadcast central station 201 through the optical fiber 510. In the video-broadcast central station 201, a broadcast signal 20 that is a second signal, which is to be supplied equally to all optical receiving parts 411 to 41n as the video-broadcast service, is inputted to the subsequent optical modulator 210. Here, a frequency band for the broadcast signal 20 is set not to overlap with any of frequency bands for the communications signals 11 to 1n. By using the incoming broadcast signal 20, the subsequent optical modulator 210 modulates the optical signal transmitted through the optical fiber 510 from the data communications central station 101 so as to collectively modulate the optical signals being multiplexed. The modulated optical signal is transmitted to the repeater station 300 through the optical fiber 520. In the repeater station 300, the demultiplexing part 310 separates the optical signal transmitted through the optical fiber 520 from the video-broadcast central station 201 for each of the wavelengths λ1, λ2, ..., λn. The separated optical signals are transmitted to the optical receiving parts 411 to 41n, respectively, through the respective optical fibers 531 to 53n. Each of the optical receiving parts 411 to 41n converts the received optical signal into an electrical signal.

Note, the preliminary optical modulators 111 to 11n can adopt an arbitrary modulation system such as a direct modulation or an external modulation. Further, the subsequent optical modulator 210 can primarily adopt an external modulator commonly in use, thereby enabling the modulation of the wavelength-division-multiplexed optical signal in such manner that the optical signals being multiplexed are collectively modulated, as described above.

Now, by specifically focusing on the optical signal having the wavelength λ1 which is to be received at the optical receiving part 411, the operation of the system is described in detail. First, in the preliminary optical modulator 111, the communications signal 11 is superimposed on an optical signal having the wavelength λ1. Thereafter, in the subsequent optical modulator 210, the broadcast signal 20 is collectively superimposed on the optical signals of all wavelengths. Accordingly the optical signal having the wavelength λ1, after separated and outputted by the demultiplexing part 310, carries both of the communications signal 11 and the broadcast signal 20. The optical signal having the wavelength λ1 is then converted to an electrical signal in the optical receiving part 411. Here, the frequency bands of the communications signal 11 and the broadcast signal 20 are previously set not to overlap, and therefore it is possible to separate and extract the communications signal 11 and the broadcast signal 20 from the electrical signal by using a band-pass filter.

Figure 2A:
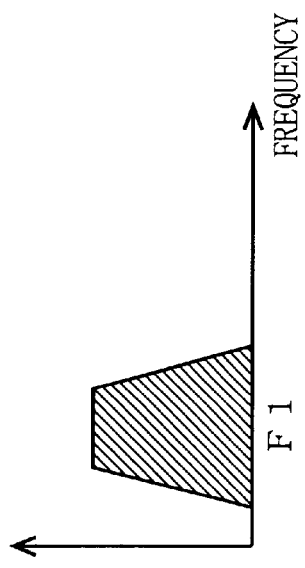
FIG. 2a is a diagram exemplarily showing a frequency spectrum of a communications signal in the first embodiment of the present invention.
Figure 2B:
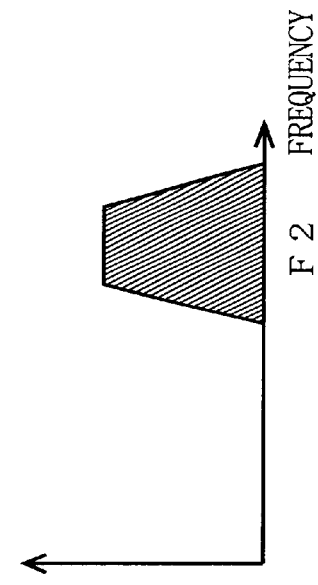
FIG. 2b is a diagram exemplarily showing a frequency spectrum of a broadcast signal in the first embodiment of the present invention.

By referring to FIGS. 2a to 2c, general idea of the frequency band allocation for each of the communications signal and the broadcast signal is described below. FIG. 2a is a diagram exemplarily showing a frequency spectrum of the communications signal in the first embodiment, and similarly, FIG. 2b is a diagram exemplarily showing a frequency spectrum of the broadcast signal. FIG. 2c is a diagram exemplarily showing a frequency spectrum of the electrical signal obtained in the optical receiving part. If the communications signal has a frequency band F1 as shown in FIG. 2a and the broadcast signal has a frequency band F2 as shown in FIG. 2b, the optical signal modulated first in the preliminary optical modulator by the communications signal, and then in the subsequent optical modulator by the broadcast signal is converted into the electrical signal having the frequency spectrum as shown in FIG. 2c. That is to say, by allocating the frequency bands F1 and F2 not to overlap each other, the communications signal and the broadcast signal are each reproduced individually from the electrical signal after conversion.

Note that the allocation of frequency bands for the communications signals 11 to 1n and the broadcast signal 20 is not limited to the one shown in FIGS. 2a to 2c but any other allocation may be acceptable as long as the frequency band of the broadcast signal 20 is not overlapping with any of that of the communications signals 11 to 1n. Further, the communications signals 11 to 1n and the broadcast signal 20 may be analog signals, digitally modulated signals, signals obtained by frequency-multiplexing such signals, or baseband signals. Note, however, baseband signals can not be used for both of the communications signals 11 to 1n and the broadcast signal 20 in view of avoiding overlapping of the frequency bands.

In the present embodiment, all sources of the plurality of communications signals 11 to 1n are assumed to be incorporated in the data communications central station 101, but if some of them are located away from the data communications central station 101, the preliminary optical modulators therefore are each placed in the corresponding signal sources at the distant locations while being connected to the wavelength-division-multiplexing part 120 through the optical fibers. Further, if the source of the broadcast signal is provided in the data communications central station 101 or the repeater station 300, the optical fiber 510 or 520 may be removed, respectively, and for each case, the wavelength-division-multiplexing part 120 and the subsequent optical modulator 210, or the demultiplexing part 310 and the subsequent optical modulator 210 may be structured on the same integrated circuit.

Figure 7:
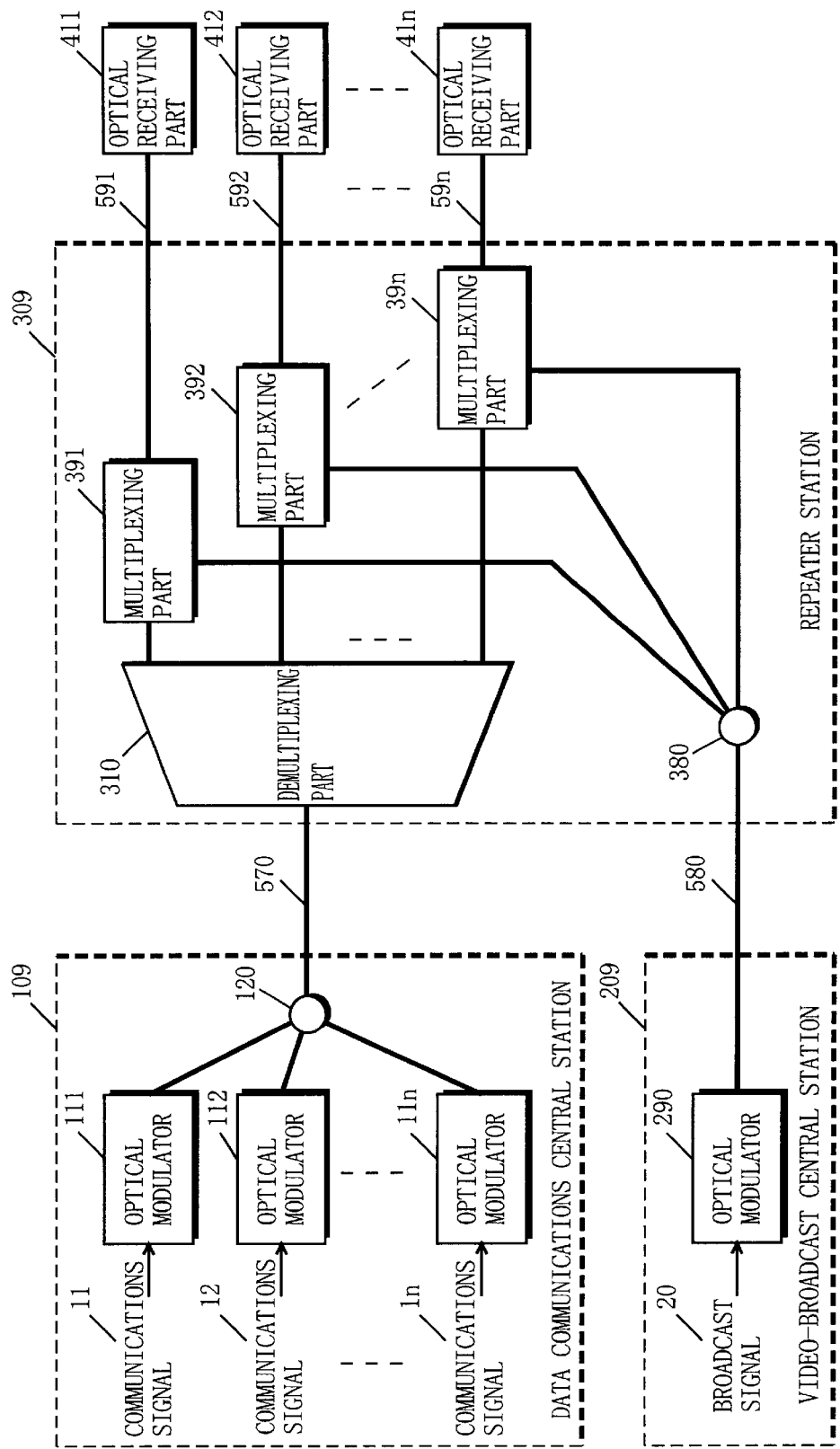
FIG. 7 is a diagram showing the structure of a conventional wavelength-division multiplex optical transmission system.

As described above, according to the first embodiment, in comparison with the conventional system shown in FIG. 7 in which the broadcast signal 20 is transmitted by using the optical signal having the wavelength unique thereto, the total system structure can be simplified by simplifying the structures of the repeater station 300 and the optical receiving parts 411 to 41n and by reducing the number of optical fibers connected to the repeater station 300. Further, the data communications central station 101 as being the signal sources of the communication signals 11 to 1n and the video-broadcast central station 201 as being the signal source of the broadcast signal 20 are connected each other through the optical fiber 510, thereby allowing flexible placement of the signal sources regardless of the distance therebetween.

Second Embodiment

Figure 3:
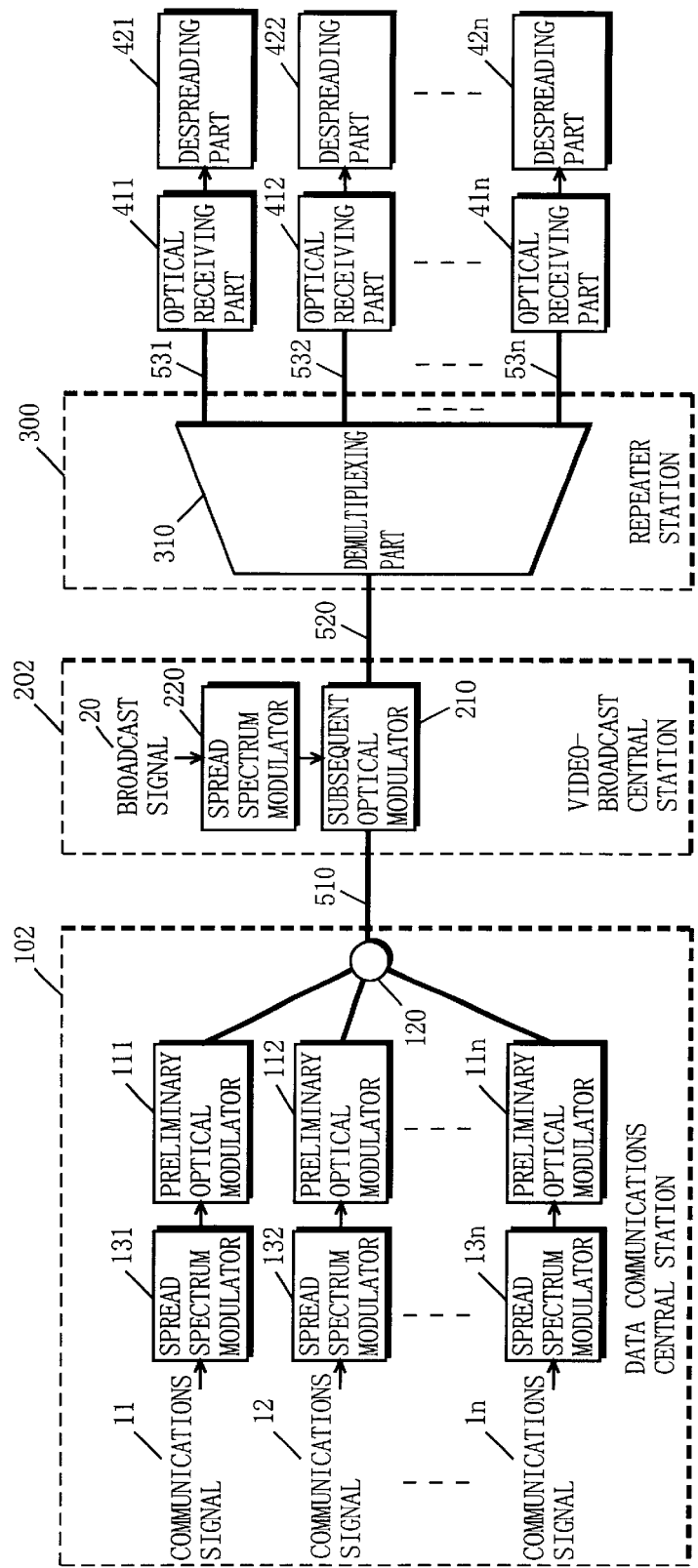
FIG. 3 is a diagram showing the structure of a wavelength-division multiplex optical transmission system according to a second embodiment of the present invention.

FIG. 3 is a block diagram showing the structure of a wavelength-division multiplex optical transmission system according to a second embodiment of the present invention. In FIG. 3, the wavelength-division multiplex optical transmission system includes: a data communications central station 102; a video-broadcast central station 202; the repeater station 300; the plurality of optical receiving parts 411 to 41n; the plurality of optical fibers 510, 520, and 531 to 53n; and a plurality of despreading parts 421 to 42n. The data communications central station 102 is provided with a plurality of spread spectrum modulators 131 to 13n, the plurality of preliminary optical modulators 111 to 11n, and the wavelength-division-multiplexing part 120. The video-broadcast central station 202 is provided with a spread spectrum modulator 220 and the subsequent optical modulator 210, and the repeater station is provided with the demultiplexing part 310. Note in FIG. 3, the constituents identical to those in FIG. 1 are given the same reference numerals.

Hereinafter, by referring to FIGS. 3 and 4a to 4f, the operation of the wavelength-division multiplex optical transmission system of the second embodiment is described. Note that the second embodiment is similar to the first in structure except that it is additionally provided with the plurality of spread spectrum modulators 131 to 13n and 220 and the plurality of despreading parts 421 to 42n. Therefore detailed description of the identical parts is omitted.

In the data communications central station 102, the plurality of communications signals 11 to 1n, which are to be supplied individually to the plurality of optical receiving parts 411 to 41n as the data communications services, are inputted to the plurality of spread spectrum modulators 131 to 13n, respectively, and are spread-spectrum-modulated by predetermined spreading codes for output to the preliminary optical modulators 111 to 11n, respectively. The plurality of the preliminary optical modulators 111 to 11n output optical signals modulated by the respective communications signals being spread-spectrum-modulated and having different wavelengths from each other. The output optical signals are wavelength-division-multiplexed and transmitted to the video-broadcast central station 202. In the video-broadcast central station 202, the broadcast signal 20, which is to be supplied equally to all optical receiving parts 411 to 41n as the video-broadcast service, is inputted to the spread spectrum modulator 220, and is spread-spectrum-modulated by a predetermined spreading code for output to the subsequent optical modulator 210. Here, the spreading code used by the spread spectrum modulator 220 is set not to overlap with any of the spreading codes used by the spread spectrum modulators 131 to 13n. By using the incoming broadcast signal being spread-spectrum-modulated, the subsequent optical modulator 210 modulates the optical signal transmitted from the data communications central station 102 so as to collectively modulate the optical signals being multiplexed. The modulated optical signal is transmitted to the repeater station 300, and therein, separated for each wavelength. The separated optical signals are converted into electrical signals in the optical receiving parts 411 to 41n, respectively, and supplied to the despreading parts 421 to 42n. By using the same spreading codes used for spread spectrum modulation, the despreading parts 421 to 42n perform despreading to reproduce desired signals out of the communications signals 11 to 1n and the broadcast signal 20.

Figure 4A:
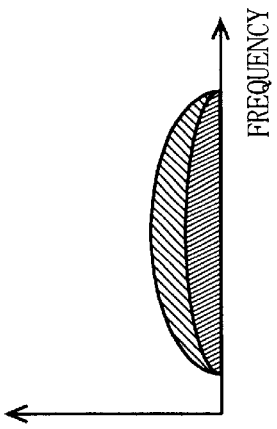
FIG. 4a is a diagram exemplarily showing a frequency spectrum of the communications signal in the second embodiment of the present invention.
Figure 4C:
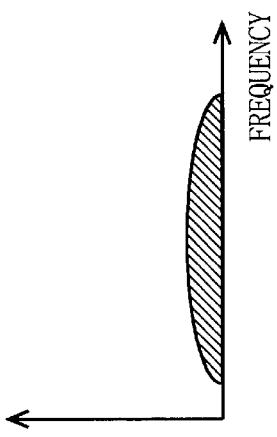
FIG. 4c is a diagram exemplarily showing a frequency spectrum of the communication signal after spread spectrum modulation in the second embodiment of the present invention.
Figure 4E:
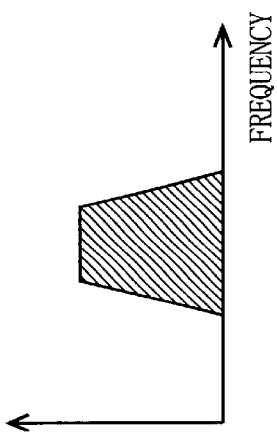
FIG. 4e is a diagram exemplarily showing a frequency spectrum of an electrical signal obtained in the optical receiving part in the second embodiment of the present invention.
Figure 4B:
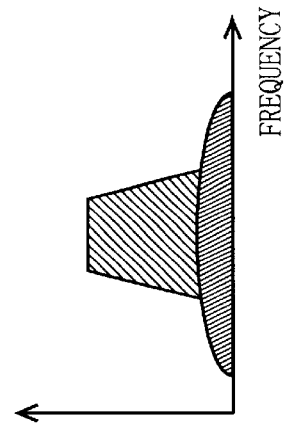
FIG. 4b is a diagram exemplarily showing a frequency spectrum of the broadcast signal in the second embodiment of the present invention.
Figure 4D:
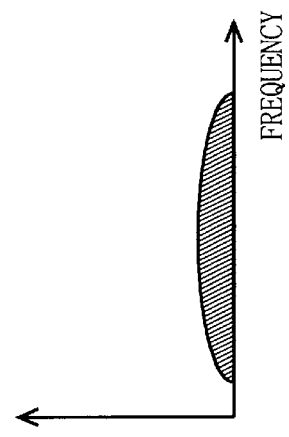
FIG. 4d is a diagram exemplarily showing a frequency spectrum of the broadcast signal after spread spectrum modulation in the second embodiment of the present invention.
Figure 4F:
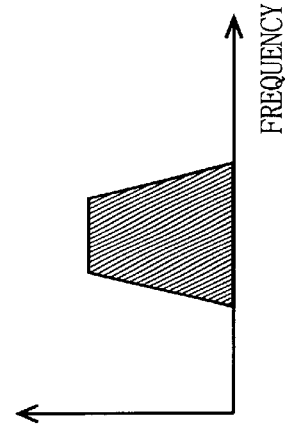
FIG. 4f is a diagram exemplarily showing a frequency spectrum of an electrical signal obtained by despreading the electrical signal obtained in the optical receiving part in the second embodiment of the present invention.

Described next, by referring to FIGS. 4a to 4f, are effects obtained by previously spread-spectrum-modulating the signals. FIG. 4a is a diagram exemplarily showing a frequency spectrum of the communications signal in the second embodiment, and FIG. 4b shows a frequency spectrum of the broadcast signal. FIGS. 4c and 4d are diagrams exemplarily showing frequency spectrums of the spread-spectrum-modulated communications signal and spread-spectrum-modulated broadcast signal, respectively. FIG. 4e is a diagram exemplarily showing a frequency spectrum of the electrical signal obtained in the optical receiving part, and FIG. 4f is a diagram exemplarily showing a frequency spectrum of the electrical signal after being despreaded. If the communications signal having the frequency spectrum shown in FIG. 4a and the broadcast signal having the frequency spectrum shown in 4b are each spread-spectrum-modulated by the different spreading codes, the signals are converted into signals having the frequency spectrums shown in FIGS. 4c and 4d, respectively. If the optical signal modulated by these signals, first in any one of preliminary optical modulators 111 to 11n and then in the subsequent optical modulator 210, is converted into the electrical signal in the corresponding optical receiving part, the electrical signal becomes, as shown in FIG. 4e, a code-division multiplex signal in which both of the spread-spectrum-modulated signals are multiplexed. The original signal can be reproduced by despreading the spread-spectrum-modulated signal with the same spreading code used for the spread spectrum modulation. It is therefore possible to despread and extract only a desired signal by setting different spreading codes for each of the communications signal and the broadcast signal. For example, if the code-division multiplex signal shown in FIG. 4e is despreaded with the spreading code used for the spread-spectrum-modulating the communications signal, an electrical signal having the frequency spectrum shown in FIG. 4f is obtained, where only the communications signal is despreaded, thereby enabling extraction of only the communications signal.

Note that there is no specific restriction on allocations of frequency bands for the communications signals 11 to 1n and the broadcast signal 20, and the frequency bands may overlap each other. Further, the communications signals 11 to 1n and the broadcast signal 20 may be analog signals, digitally-modulated signals, signals obtained by frequency-multiplexing such signals, or baseband signals. Furthermore, different from the first embodiment, baseband signals can be used for both of the communications signals 11 to 1n and the broadcast signal 20 because overlapping of the frequency bands is accepted herein.

Still further, the spreading codes used by the spread spectrum modulators 131 to 13n may be different or the same each other as long as all of them are set different from the spreading code used by the spread spectrum modulator 220.

In the present embodiment, similarly to the first embodiment, all of the sources of the plurality of communications signals 11 to 1n are assumed to be incorporated in the data communications central station 102. If some of them are located away from the data communications central station 102, the spread spectrum modulators and preliminary optical modulators therefor are respectively placed in the corresponding signal sources at the distant locations while extending the connection between the wavelength-division-multiplexing part 120 and the preliminary optical modulators through the optical fibers. Further, if the source of the broadcast signal is provided in the data communications central station 102 or the repeater station 300, the optical fiber 510 or 520 may be removed. For each case, the wavelength-division-multiplexing part 120 and the subsequent optical modulator 210, or the demultiplexing part 310 and the subsequent optical modulator 210 may be structured on the same integrated circuit.

As described above, according to the second embodiment, similarly to the first embodiment, the structure of the total system can be simplified, and the placement of the signal sources can be determined flexibly regardless of the distance. Further, overlapping of the frequency bands of the communications signals 11 to 1n and the broadcast signal 20 can be accepted by applying a code-division multiplex, thereby enabling efficient utilization of the frequency bands of the electrical signal and setting of signal types without restrictions.

Third Embodiment

FIG. 5 is a block diagram showing the structure of a wavelength-division multiplex optical transmission system according to a third embodiment of the present invention. In FIG. 5, the wavelength-division multiplex optical transmission system includes: a data communications central station 103; the video-broadcast central station 201; the repeater station 300; the plurality of optical receiving parts 411 to 41n; and the plurality of optical fibers 510, 520, and 531 to 53n. The data communications central station 103 is provided with a switch 140, the plurality of preliminary optical modulators 111 to 11n, and the wavelength-division-multiplexing part 120. The video-broadcast central station 201 is provided with the subsequent optical modulator 210, and the repeater station 300 is provided with the demultiplexing part 310. Note in FIG. 5, the constituents identical to those in FIG. 1 are given the same reference numerals.

Hereinafter, by referring to FIG. 5, the operation of the wavelength-division multiplex optical transmission system of the third embodiment is described. Note that the third embodiment is similar in structure to the first except that it is additionally provided with the switch 140, and therefore detail description of the identical parts is omitted.

In the data communications central station 103, a communications signal 30 is inputted to the switch 140. The communications signal 30 is a signal to be supplied exclusively to any one of the optical receiving parts 411 to 41n as the data communications service. The switch 140 selects one of the plurality of preliminary optical modulators 111 to 11n, and supplies the communications signal 30 only to the selected preliminary optical modulator. The plurality of the preliminary optical modulators 111 to 11n each output optical signals having different wavelengths from each other after modulation by the communications signal 30 if being supplied therewith, and without modulation if not being supplied therewith. Thereafter, similarly to the first embodiment, the optical signals outputted from the plurality of preliminary optical modulators 111 to 11n are wavelength-division-multiplexed, collectively modulated by the broadcast signal 20, separated for each wavelength, and then converted into electrical signals in respective optical receiving parts 411 to 41n. Note that a frequency band of the broadcast signal 20 is set not to overlap with that of the communications signal 30.

Herein, the preliminary optical modulators 111 to 11n and the optical receiving parts 411 to 41n have one-to-one correspondence. Accordingly, if the switch 140 selectively supplies the communications signal 30 to the preliminary optical modulator 111 out of the plurality of preliminary optical modulators 111 to 11n, for example, the communications signal 30 is carried on an optical signal having the wavelength $\lambda 1$ and supplied only to the optical receiving part 411 but not to the other optical receiving parts 412 to 41n. On the other hand, the preliminary optical modulators 112 to 11n which are not being supplied with the communications signal 30 also output optical signals without modulation. All of the output optical signals including unmodulated optical signals are multiplexed and then collectively modulated by the broadcast signal 20 in the subsequent optical modulator 210. Consequently, the broadcast signal 20 is received at each of the optical receiving parts 411 to 41n. That is to say, the communications signal 30 can be selectively supplied to any of the optical receiving parts 411 to 41n with ease while supplying the broadcast signal 20 to all of the optical receiving parts 411 to 41n. Note that the frequency bands of the communications signal 30 and the broadcast signal 20 can be set at will as long as they are not overlapping with each other. Further, the communications signal 30 and the broadcast signal 20 may be analog signals, digitally modulated signals, signals obtained by frequency-multiplexing such signals, or baseband signals, Note, however, baseband signals can not be used for both of the communications signal 30 and the broadcast signal in view of avoiding overlapping of the frequency bands.

Further, similarly to the first embodiment, if the source of the broadcast signal is provided in the data communications central station 103 or the repeater station 300, the optical fiber 510 or 520 may be removed, respectively. For each case, the wavelength-division-multiplexing part 120 and the subsequent optical modulator 210, or the demultiplexing part 310 and the subsequent optical modulator 210 may be structured on the same integrated circuit.

As described above, according to the third embodiment, as is the case with the first embodiment, the total system structure can be simplified, and the placement of the signal sources can be determined flexibly regardless of the distance. Further, the communications signal 30 can be selectively supplied to any desired one of the optical receiving part 411 to 41n with ease while supplying the broadcast signal 20 to all of the optical receiving parts 411 to 41n.

Fourth Embodiment

FIG. 6 is a block diagram showing the structure of a wavelength-division multiplex optical transmission system according to a fourth embodiment of the present invention. In FIG. 6, the wavelength-division multiplex optical transmission system includes: a first data communications central station 101; the video-broadcast central station 201; a second data communications central station 600; a wavelength-division-multiplexing part 620; the repeater station 300; a plurality of optical receiving parts 411 to 41n and 641 to 64n; and a plurality of optical fibers 510, 540, 550, 531 to 53n, and 631 to 63n. The first data communications central station 101 is provided with the plurality of preliminary optical modulators 111 to 11n, and the wavelength-division-multiplexing part 120, and the video-broadcast central station 201 is provided with the subsequent optical modulator 210. The second data communications central station 600 is provided with a plurality of optical modulators 611 to 61n, and the repeater station 300 is provided with the demultiplexing part 310. Note in FIG. 6, the constituents identical to those in FIG. 1 are given the same reference numerals.

Hereinafter, by referring to FIG. 6, the operation of the wavelength-division multiplex optical transmission system of the fourth embodiment is described. Note that the fourth embodiment is similar in structure to the first except that it is additionally provided with the second communications central station 600, the wavelength-division-multiplexing part 620, the plurality of optical receiving parts 641 to 64n, and the plurality of optical fibers 631 to 63n, and that the optical fibers 540 and 550 serve as an alternative to the optical fiber 520. Therefore, detailed description of the identical parts is omitted.

As is the case with the first embodiment, in the first data communications central station 101, the plurality of communications signals 11 to 1n, which are to be supplied individually to each of the optical receiving parts 411 to 41n, are each superimposed on the optical signals having different wavelengths $\lambda 1, \lambda 2, \ldots, \lambda n$. The optical signals are wavelength-division-multiplexed and transmitted to the video-broadcast central station 201 through the optical fiber 510. In the video-broadcast central station 201, the broadcast signal 20, which is to be supplied equally to all optical receiving parts 411 to 41n, is superimposed on the optical signal transmitted from the first data communications central station 101 so as to collectively modulate the optical signals being multiplexed. The optical signal is then transmitted to the wavelength-division-multiplexing part 620 through the optical fiber 540. Herein, similarly to the first embodiment, a frequency band for the broadcast signal 20 is set not to overlap with any of frequency bands of the communications signals 11 to 1n. On the other hand, in the second data communications central station 600, a plurality of communications signals 61 to 6n, which are to be supplied individually to each of the optical receiving parts 641 to 64n as data communications services, are inputted to the plurality of preliminary optical modulators 611 to 61n, respectively. The plurality of preliminary optical modulators 611 to 61n output optical signals each modulated by the corresponding incoming communications signals 61 to 6n and having wavelengths $\lambda 11, \lambda 12, \ldots, \lambda 1n$ which differ from each other and also differ from any of those of the optical signals outputted from the preliminary optical modulators 111 to 11n. The output optical signals are each transmitted to the wavelength-division-multiplexing part 620. In the wavelength-division-multiplexing part 620, the optical signal transmitted from the video-broadcast central station 201 obtained by multiplexing the plurality of optical signals having the wavelengths $\lambda 1, \lambda 2, \ldots, \lambda n$ and the plurality of optical signals having the wavelengths $\lambda 11, \lambda 12, \ldots, \lambda 1n$ transmitted from the second data communications central station 600 are multiplexed. The multiplexed optical signal is transmitted to the repeater station 300 through the optical fiber 550. In the repeater station 300, the received optical signal is separated for each of the wavelengths $\lambda 1, \lambda 2, \ldots, \lambda 1n$, and $\lambda 11, \lambda 12, \ldots, \lambda 1n$ in the demultiplexing part 310. The separated optical signals are transmitted to the respective optical receiving parts 411 to 41n and 641 to 64n through the respective optical fibers 531 to 53n and 631 to 63n. Thereafter, the optical signals are each converted into electrical signals.

Next, the flow of each signal in the present embodiment is described. On the optical signals having the wavelengths $\lambda 1, \lambda 2, \ldots, \lambda n$, the communications signals 11 to 1n are superimposed, respectively, and further the broadcast signal 20 is collectively superimposed. Accordingly, each of the optical receiving parts 411 to 41n obtains the electrical signal in which one of the communications signals 11 to 1n and the broadcast signal 20 being frequency multiplexed. On the other hand, on the optical signals having the wavelengths $\lambda 11, \lambda 12, \ldots, \lambda 1n$ only the communications signals 61 to 6n are super imposed, respectively. Accordingly, the optical receiving parts 641 to 64n obtain the electrical signals carrying only the communications signals 61 to 6n, respectively. That is to say, the optical signals which do not need to carry the broadcast signal 20 are additionally multiplexed with the optical signal transmitted from the subsequent optical modulator 210 by the wavelength-division-multiplexing part 620 and separated again by the demultiplexing part 310. Thereby, the optical signals for the optical receiving parts 641 to 64n can be transmitted together with the optical signal for the optical receiving parts 411 to 41n through the same transmission path.

Note that the frequency bands for the communications signals 11 to 1n, the broadcast signal 20 and the communications signals 61 to 6n can be set at will as long as the frequency band for the broadcast signal 20 is set not to overlap with any one of those for the communications signals 11 to 1n, as described above. That means frequency bands for the communications signals 11 to 1n may overlap each other. The frequency bands for the communications signals 61 to 6n may overlap with those of the communications signals 11 to 1n and broadcast signal 20, and may also overlap with each other. Further, the communications signals 11 to 1n and the broadcast signal 20 can assume signal types that have been described in the first embodiment. As to the communications signals 61 to 6n, their signal types can be determined without considering the types of the communications signals 11 to 1n and the broadcast signal 20. They may be, for example, analog signals, digitally modulated signals, signals obtained by frequency-multiplexing such signals, or baseband signals.

As such, in the present embodiment, provided that the wavelengths of the optical signals are different from each other, the signal flow from the first data communications central station 101 to the video-broadcast central station 201 and then to the optical receiving parts 411 to 41n, and the signal flow from the second data communications central station 600 to the optical receiving parts 641 to 64n are mutually independent without effecting each other on the flows of the electrical signals, types thereof, and the frequency bands thereof even sharing the optical fiber 550 and the repeater station 300.

As described in the foregoing, according to the fourth embodiment, similarly to the first embodiment, the total system structure can be simplified, and the placement of the signal sources can be determined flexibly regardless of the distance. Further, the optical signals can be transmitted to the optical receiving parts which are in no need of the broadcast signal 20 by sharing the optical fiber 550 and the repeater station 300 with the optical signal carrying the broadcast signal 20, thereby achieving efficient use of the system.

While the invention has been described in detail, the foregoing description is in all aspects illustrative and not restrictive. It is understood that numerous other modifications and variations can be devised without departing from the scope of the invention.

What is claimed is:

1. A wavelength-division multiplex optical transmission system for simultaneously transmitting first signals to be supplied individually to a plurality of optical receiving parts and a second signal to be supplied equally thereto on a wavelength-division-multiplexed optical signal, said system comprising:

a plurality of preliminary optical modulators, to which the plurality of first signals are each inputted, each being operable to output optical signals having different wavelengths from each other and being modulated by the plurality of first signals;

a wavelength-division-multiplexing part operable to multiplex the optical signals outputted by said plurality of preliminary optical modulators;

a subsequent optical modulator, to which the second signal is inputted, operable to intensity modulate the optical signal received from said wavelength-division-multiplexing part by the second signal so as to collectively modulate the optical signals being multiplexed; and a demultiplexing part operable to separate the optical signal modulated by said subsequent optical modulator for each wavelength, wherein the plurality of optical receiving parts are each provided for receiving each of the optical signals separated and outputted by said demultiplexing part, and for converting the received optical signal into an electrical signal.

2. The wavelength-division multiplex optical transmission system as claimed in claim 1, wherein a frequency band for the second signal does not overlap with any of frequency bands for the plurality of first signals.

3. The wavelength-division multiplex optical transmission system as claimed in claim 1,
wherein said wavelength-division-multiplexing part and said demultiplexing part are connected to each other through an optical transmission path, and
wherein said subsequent optical modulator is provided at an arbitrary place on the optical transmission path.

4. The wavelength-division multiplex optical transmission system as claimed in claim 1, further comprising:
a plurality of first spread spectrum modulators each being operable to spread-spectrum-modulate each of the plurality of first signals with spreading codes for output to said plurality of preliminary optical modulators;
a second spread spectrum modulator operable to spread-spectrum-modulate the second signal with a spreading code for output to said subsequent optical modulator; and
a plurality of despreading parts each being operable to despread each of the electrical signals converted in the plurality of optical receiving parts,
wherein the spreading code used by said second spread spectrum modulator is different from any of the spreading codes used by said first spread spectrum modulators.

5. The wavelength-division multiplex optical transmission system as claimed in claim 1, further comprising
a subsequent wavelength-division-multiplexing part provided between said subsequent optical modulator and said demultiplexing part, said subsequent wavelength-division-multiplexing part being operable to multiplex the optical signal outputted by said subsequent optical modulator and other one or more optical signals,
wherein wavelengths of the other one or more optical signals being multiplexed differ from any of the wavelengths of the optical signals outputted by said plurality of preliminary optical modulators, and differ from each other.

6. The wavelength-division multiplex optical transmission system as claimed in claim 1, wherein
the second signal is a broadcast signal.

7. The wavelength-division multiplex optical transmission system as claimed in claim 1,
wherein said demultiplexing part is operable to output the separated optical signals to the plurality of optical receiving parts when the plurality of optical receiving parts are provided in different locations.

8. A wavelength-division multiplex optical transmission device for simultaneously transmitting first signals to be supplied individually to a plurality of optical receiving parts and a second signal to be supplied equally thereto on a wavelength-division-multiplexed optical signal, said device comprising:
a plurality of preliminary optical modulators, to which the plurality of first signals are each inputted, each operable to output optical signals having different wavelengths from each other and being modulated by the plurality of first signals;
a wavelength-division-multiplexing part operable to multiplex the optical signals outputted by said plurality of preliminary optical modulators; and
a subsequent optical modulator, to which the second signal is inputted, operable to intensity modulate the optical signal received from said wavelength-division-multiplexing part by the second signal so as to collectively modulate the optical signals being multiplexed.

9. The wavelength-division multiplex optical transmission device as claimed in claim 8, wherein
a frequency band for the second signal does not overlap with any of frequency bands for the plurality of first signals.

10. The wavelength-division multiplex optical transmission device as claimed in claim 8, further comprising:
a plurality of first spread spectrum modulators each being operable to spread-spectrum-modulate each of the plurality of first signals with spreading codes for output to said plurality of preliminary optical modulators; and
a second spread spectrum modulator operable to spread-spectrum-modulate the second signal with a spreading code for output to said subsequent optical modulator,
wherein the spreading code used by said second spread spectrum modulator is different from any of the spreading codes used by said first spread spectrum modulators.

11. The wavelength-division multiplex optical transmission system as claimed in claim 8, wherein
the second signal is a broadcast signal.

12. The wavelength-division multiplex optical transmission device as claimed in claim 8,
wherein said demultiplexing part is operable to output the separated optical signals to the plurality of optical receiving parts when the plurality of optical receiving parts are provided in different locations.

13. A wavelength-division multiplex optical transmission method for simultaneously transmitting first signals to be supplied individually to a plurality of optical receiving parts and a second signal to be supplied equally thereto on a wavelength-division-multiplexed optical signal, said method comprising:
outputting optical signals having different wavelengths from each other and being modulated by the plurality of first signals;
multiplexing the optical signals outputted in said outputting; and
intensity-modulating the optical signal obtained in said multiplexing by the second signal so as to collectively modulate the optical signals being multiplexed.

14. The wavelength-division multiplex optical transmission method as claimed in claim 13, wherein
a frequency band for the second signal does not overlap with any of frequency bands for the plurality of first signals.

15. The wavelength-division multiplex optical transmission method as claimed in claim 15, further comprising:
spread-spectrum-modulating each of the plurality of first signals with spreading codes before said outputting; and
spread-spectrum-modulating the second signal with a spreading code before said modulating,
wherein the spreading code used in said spread spectrum modulating the second signal is different from any of the spreading codes used in said spread-spectrum-modulating each of the plurality of first signals.

16. The wavelength-division multiplex optical transmission system as claimed in claim 13, wherein
the second signal is a broadcast signal.

17. The wavelength-division multiplex optical transmission method as claimed in claim 13, further comprising:

demulitplexing the intensity-modulated multiplexed optical signal; and outputting the demultiplexing signals to the plurality of optical receiving parts in different locations.

18. A wavelength-division multiplex optical communication system for simultaneously transmitting first signals to be supplied individually to a plurality of optical receiving parts and a second signal to be supplied equally thereto on a wavelength-division-multiplexed optical signal, said system comprising:

a plurality of preliminary optical modulators, to which the plurality of first signals are each inputted, each being operable to output optical signals having different wavelengths from each other and being modulated by the plurality of first signals;

a wavelength-division-multiplexing part operable to multiplex the optical signals outputted by said plurality of preliminary optical modulators;

a subsequent optical modulator, to which the second signal is inputted, operable to intensity modulate the optical signal received from said wavelength-division-multiplexing part by the second signal so as to collectively modulate the optical signals being multiplexed;

a demultiplexing part operable to separate the optical signal modulated by said subsequent optical modulator for each wavelength as a plurality of received optical signals; and a plurality of optical receiving parts, each provided for receiving a respective one of the plurality of the received optical signals, and being operable to convert the respective received optical signal into an electrical signal.

19. The wavelength-division multiplex optical transmission system as claimed in claim 18, wherein said plurality of optical receiving parts are provided in different locations.

* * * * *